United States Patent
Qi et al.

(10) Patent No.: US 11,287,734 B2
(45) Date of Patent: Mar. 29, 2022

(54) LIGHT PROJECTION DEVICE AND ELECTRONIC DEVICE USING SAME

(71) Applicant: TRIPLE WIN TECHNOLOGY (SHENZHEN) CO. LTD., Shenzhen (CN)

(72) Inventors: Wei-Wei Qi, Guangdong (CN); Ching-Huang Lin, Taoyuan (TW)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/901,209

(22) Filed: Jun. 15, 2020

(65) Prior Publication Data
US 2021/0149290 A1     May 20, 2021

(30) Foreign Application Priority Data
Nov. 20, 2019  (CN) .......................... 201922015973.3

(51) Int. Cl.
G03B 21/20    (2006.01)
G02B 27/09    (2006.01)
F21V 13/04    (2006.01)
G06K 9/20     (2006.01)

(52) U.S. Cl.
CPC .......... *G03B 21/2066* (2013.01); *F21V 13/04* (2013.01); *G02B 27/0944* (2013.01); *G06K 9/20* (2013.01)

(58) Field of Classification Search
CPC ... F21V 13/04; G02B 27/0944; G02B 27/144; G03B 21/2066; G06K 9/20
See application file for complete search history.

(56) References Cited

U.S. PATENT DOCUMENTS

| | | | | |
|---|---|---|---|---|
| 5,124,841 A | * | 6/1992 | Oishi | G02B 27/283 359/485.02 |
| 2014/0003059 A1 | * | 1/2014 | Wang | G02B 19/0061 362/308 |
| 2017/0351110 A1 | * | 12/2017 | Gurgov | G02B 19/0028 |
| 2018/0352159 A1 | * | 12/2018 | Kim | G03B 17/04 |
| 2021/0141199 A1 | * | 5/2021 | Qi | G02B 17/006 |
| 2021/0173210 A1 | * | 6/2021 | Elazhary et al. | G02B 27/0056 |

FOREIGN PATENT DOCUMENTS

| | | | | | |
|---|---|---|---|---|---|
| CN | 108713203 A | * | 10/2018 | | G06K 9/20 |
| CN | 211375203 U | * | 8/2020 | | G02B 27/42 |
| JP | 2014209225 A | * | 11/2014 | | G02F 1/1335 |
| JP | 2019174575 A | * | 10/2019 | | G02F 1/1335 |
| WO | WO-2019213861 A1 | * | 11/2019 | | G06K 9/20 |

* cited by examiner

*Primary Examiner* — Michelle M Iacoletti
*Assistant Examiner* — Magda Cruz
(74) *Attorney, Agent, or Firm* — ScienBiziP, P.C.

(57) ABSTRACT

A single light projection device providing illumination in two opposing directions includes a lens module and a light source module. The lens module includes a light-incident surface, a first light-emitting surface, and a second light-emitting surface. The light source module includes a light source configured for emitting light toward the light-incident surface. The first light-emitting surface and the second light-emitting surface introduce the light from the light source module outside of the light projection device in two different and opposing directions.

15 Claims, 4 Drawing Sheets

LIGHT PROJECTION DEVICE AND ELECTRONIC DEVICE USING SAME

FIELD

The subject matter herein generally relates to a technical field of optical path design, in particular to a light projection device and an electronic device using the light projection device.

BACKGROUND

A conventional electronic device generally has a light projection device for face recognition. The optical projection device can only project light in one direction. However, for a double-sided screen electronic device, such as folding screen mobile phone, it is required that the electronic device can project light forward and backward in two directions to achieve facial recognition on both screens. The conventional optical projection device that can only project in one direction inside the mobile electronic device is not suitable. Therefore, there is room for improvement in the art.

BRIEF DESCRIPTION OF THE DRAWINGS

Implementations of the present technology will now be described, by way of embodiments only, with reference to the attached figures.

DETAILED DESCRIPTION

Figure 1:
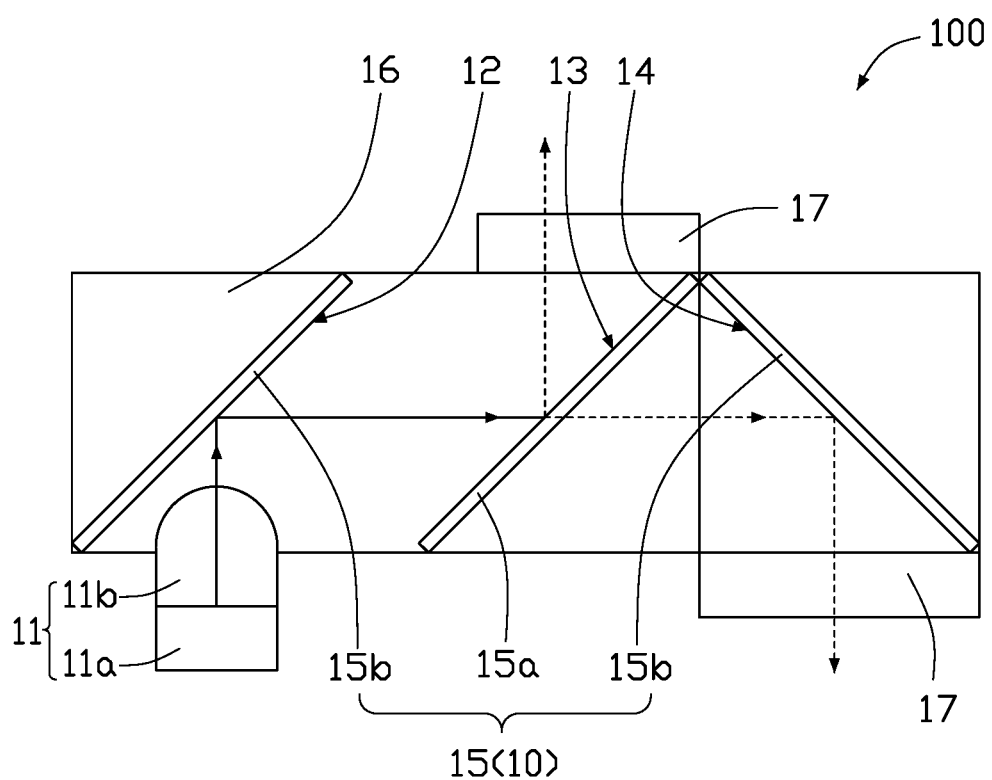
FIG. 1 is a planar view of a light projection device according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

FIG. 1 illustrates a light projection device 100. The light projection device 100 includes a lens module 10 and a light source module 11. The lens module 10 includes a light-incident surface 12, a first light-emitting surface 13, and a second light-emitting surface 14. The light source module 11 is used to emit light toward the light-incident surface 12. Light is incident on the light-incident surface 12, and then exits from the light projection device 100 by the first light-emitting surface 13 and the second light-emitting surface 14. The first light-emitting surface 13 and the second light-emitting surface 14 introduce light from the light source module 11 outside of the light projection device 100 into two different directions.

The light source module 11 includes a light source 11a and a collimating lens 11b. The light source 11a is configured to emit light. The collimating lens 11b is configured to collimate the light emitted from the light source 11a. The lens module 10 includes at least two reflective sheets 15. The reflective sheets 15 are configured to introduce the light emitted from the light source module 11 to form a required light path. In the present embodiment, there are three reflective sheets 15. One reflective sheet 15 is semi-reflective (semi-reflective sheet 15a), the other two reflective sheets 15 are sheets which are totally reflective (total reflective sheets 15b). The semi-reflective sheet 15a can function as a light-reflecting surface and a light transmitting unit according to the selection. The reflectivity of the semi-reflective sheet 15a according to the embodiment of the present disclosure is about fifty percent. That is, 50% of light is reflected by the semi-reflective sheet 15a; and the remaining 50% of light passes through the semi-reflective sheet 15a.

As shown in FIG. 1, the two total reflective sheets 15b are arranged spaced apart from each other, and the semi-reflective sheet 15a is located between the two total reflective sheets 15b. A reflective surface of the semi-reflective sheet 15a is the first light-emitting surface 13. The light-incident surface 12 is a reflective surface of one of the two total reflective sheets 15b; and the second light-emitting surface 14 is a reflective surface of the other one of the two total reflective sheets 15b. As shown in FIG. 1, the light-incident surface 12 faces and is parallel with the first light-emitting surface 13, and the first light-emitting surface 13 intersects the second light-emitting surface 14. The semi-reflective sheet 15a is spaced apart from and parallel with one total reflective sheet 15b and intersects with the other one total reflective sheet 15b. In this embodiment, the first light-emitting surface 13 is perpendicular to the second light-emitting surface 14. The light emitted from the light source module 11 is incident on the light-incident surface 12 and reflected by the light-incident surface 12 to reach the semi-reflective sheet 15a where the first light-emitting surface 13 is located. A portion of the light is directly reflected by the semi-reflective sheet 15a to the outside of the light projection device 100, and other portion of the light passes through the semi-reflective sheet 15a to reach the second light-emitting surface 14. Such other portion of the light is reflected by the second light-emitting surface 14 to the outside of the light projection device 100, at an angle approximately 180 degrees away from the first reflected portion of light.

The light projection device 100 further includes a frame 16. The frame 16 is configured to fix and support the lens module 10. In particular, in the present embodiment, a propagation medium of the light between the reflective sheets 15 may be either air or a transparent medium other than air. If the propagation medium is air, the frame 16 may be made of a non-transparent material, as long as the frame 16 does not block the optical path formed by the reflective sheets 15. If the frame 16 is made of a transparent medium in which light can propagate, the frame 16 may be a solid block and the reflective sheets 15 may be embedded in the frame 16.

As shown in FIG. 1, the light projection device 100 is further provided with two diffractive optical elements 17. One of the diffractive optical elements 17 is positioned on the light-emitting path of the first light-emitting surface 13, and the other one is positioned on the light-emitting path of the second light-emitting surface 14. In the present embodiment, the frame 16 is substantially a rectangular block, and the two diffractive optical elements 17 are positioned on opposite surfaces of the frame 16. When the frame 16 is made of a non-transparent material, the frame 16 is provided with a transparent surface at the contact surface with the diffractive optical element 17, so that light can pass through the frame 16 to the outside of the lens module 10.

Figure 2:
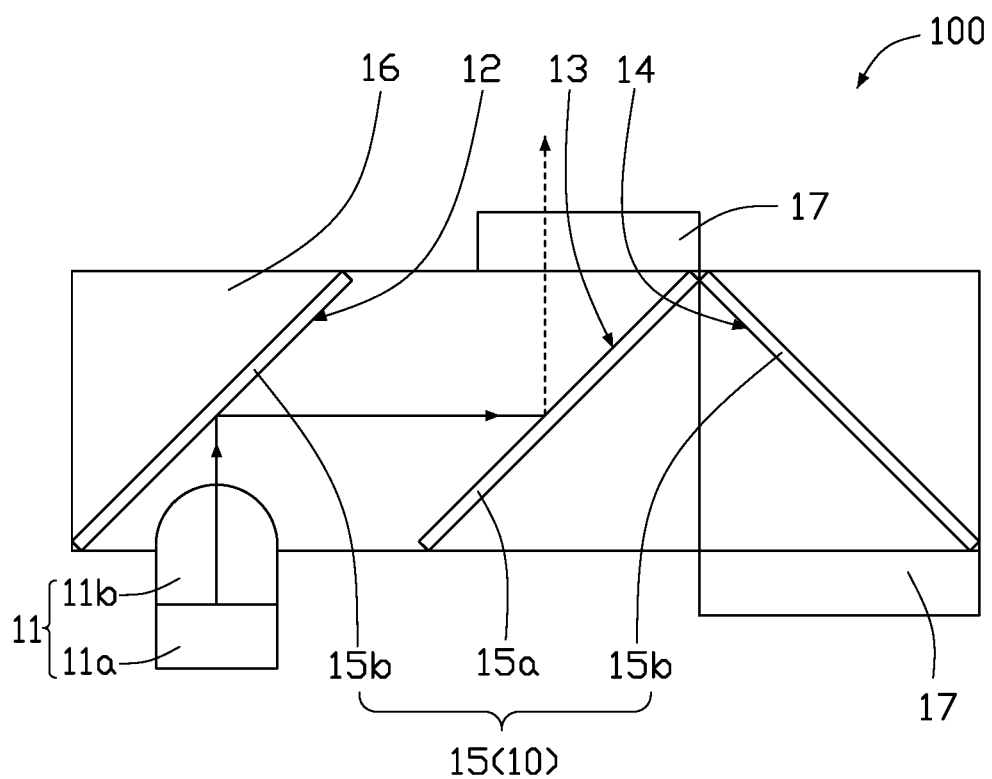
FIG. 2 is a view showing an optical path of the light projection device.

As shown in FIG. 2, the light emitted from the light source module 11 is incident on the light-incident surface 12, reflected by the light-incident surface 12 to the first light-emitting surface 13 of the semi-reflective sheet 15a, and then reflected by the first light-emitting surface 13 towards the diffractive optical element 17. The light finally passes through the diffractive optical element 17 and is emitted outwards in a first direction.

Figure 3:
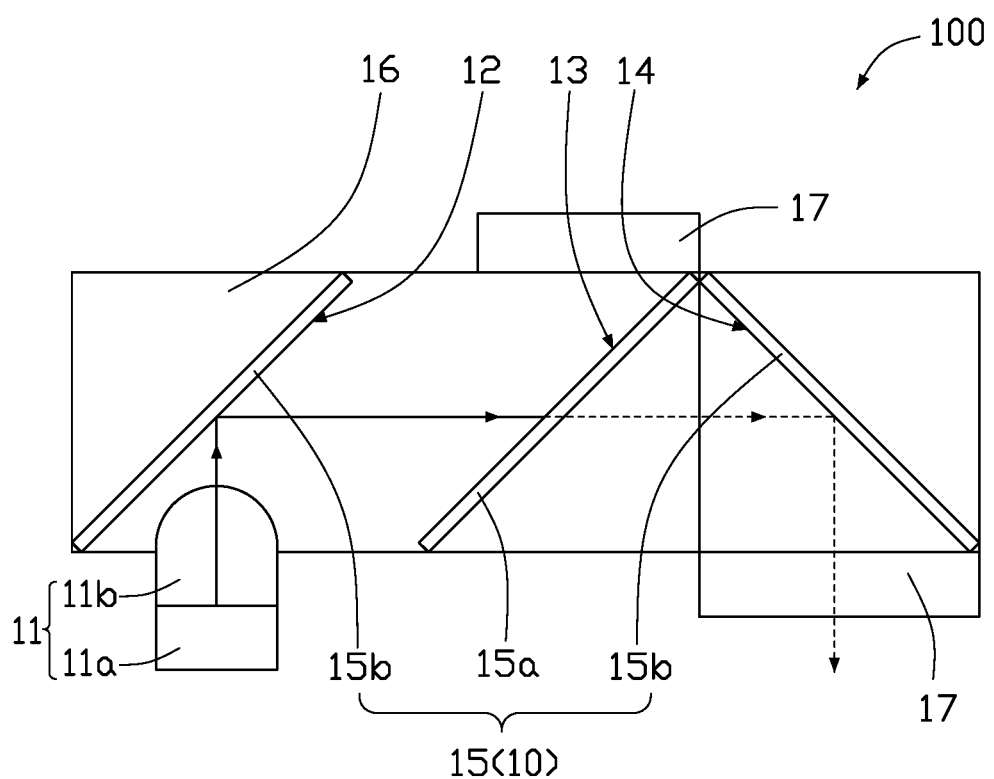
FIG. 3 is a view showing another optical path of the light projection device.

As shown in FIG. 3, the light emitted from the light source module 11 is incident on the light-incident surface 12, reflected by the light-incident surface 12 to the semi-reflective sheet 15a, and passes through the semi-reflective sheet 15a to the second light-emitting surface 14, and then is reflected by the second light-emitting surface 14 towards the diffractive optical element 17. The light finally passes through the diffractive optical element 17 and is emitted outwards in a second direction substantially opposite to the first direction.

The diffractive optical element 17 corresponding to the first light-emitting surface 13 and the diffractive optical element 17 corresponding to the second light-emitting surface 14 are located at opposite sides of the frame 16, and the light projection device 100 can project light in the two opposite directions, which achieves a purpose of facial recognition on both screens. In additional, the light passing through the diffractive optical element 17 can be transmitted to a designated camera lens by optical fibers.

Figure 4:
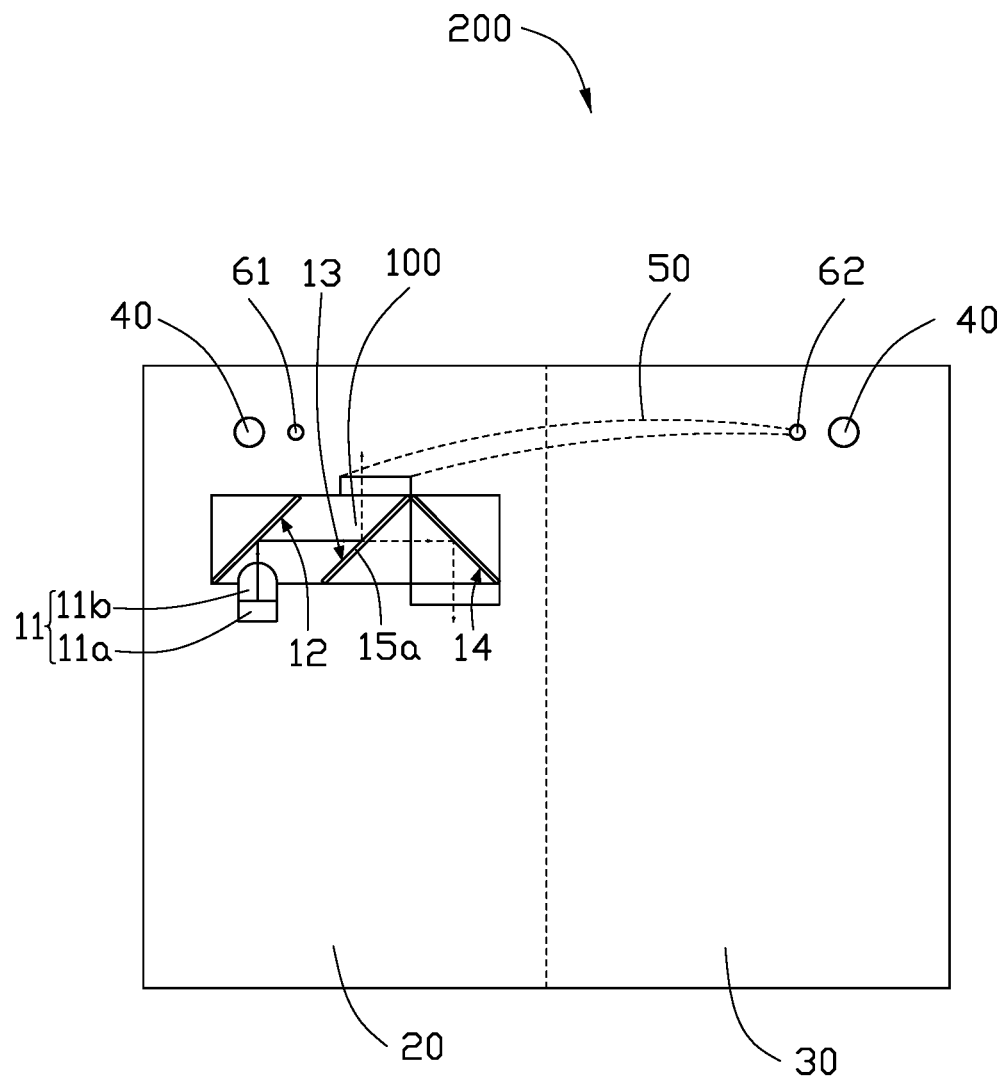
FIG. 4 is a schematic view of an electronic device.

FIG. 4 illustrates an electronic device 200 having the light projection device 100. The electronic device 200 may be a folding screen electronic device or an electronic device with dual screens. The electronic device 200 includes a first screen 20, a second screen 30, two cameras 40, and the light projection device 100. One of the cameras 40 is provided for the first screen 20, and the other one is provided for the second screen 30. In one embodiment, the first screen 20 and the second screen 30 are independent screens that can display images independently. In other embodiments, the first screen 20 and the second screen 30 are made by folding one single flexible screen; the first screen 20 and the second screen 30 can cooperate with each other to display images, or the first screen 20 and the second screen 30 can display different images. The two cameras 40 may cooperate with the light projection device 100 for face recognition, for unlocking the electronic device 200 for example.

In this embodiment, the light projection device 100 is arranged to be within the first screen 20. The first screen 20 is provided with a first projection port 61, and the second screen 30 is provided with a second projection port 62. The light exiting from the first light-emitting surface 13 is transmitted to the first projection port 61 of the first screen 20, and the light exiting from the second light-emitting surface 14 is transmitted to the second projection port 62 of the second screen 30.

As shown in FIG. 4, the electronic device 200 further includes a light transmission member 50 for transmitting the light exiting from the first light-emitting surface 13 of the light projection device 100 to the second projection port 62 of the second screen 30. Finally, the light of the light projection device 100 exits from the first projection port 61 to the outside of the electronic device 200, and the light projection device 100 cooperates with the camera 40 of the first screen 20 for face recognition. In this embodiment, the light transmission member 50 may be optical fibers.

When the second screen 30 is used to unlock the electronic device 200, the light source module 11 emits light toward the light-incident surface 12, and the light exits from the first light-emitting surface 13 and is transmitted to the second projection port 62 of the second screen 30 by the light transmission member 50. When the first screen 20 needs to be used to unlock the electronic device 200, the light emitted from the light source module 11 is incident on the light-incident surface 12, passes through the semi-reflective sheet 15a, and enters and is reflected by the second light-emitting surface 14 to the first projection port 61. As a result, the electronic device 200 can project light required for face recognition in two directions.

The light projection device 100 of the present disclosure realizes two opposing optical paths by one single light source module 11, thus projecting light on both sides of the electronic device 200. The electronic device 200 can achieve facial recognition on both screens.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A light projection device, comprising:
a lens module, the lens module comprising a light-incident surface, a first light-emitting surface, and a second light-emitting surface; and
a light source module, the light source module comprising a light source configured for emitting light toward the light-incident surface;
wherein the first light-emitting surface and the second light-emitting surface are configured to introduce the light from the light source module outside of the light projection device in two different directions;
wherein the lens module comprises reflective sheets;
wherein the reflective sheets comprise a semi-reflective sheet and two total reflective sheets;
wherein the light-incident surface is a reflective surface of one of the two total reflective sheets; the first light-emitting surface is a reflective surface of the semi-reflective sheet, and the second light-emitting surface is a reflective surface of the other one of the two total reflective sheets.

2. The light projection device of claim 1, wherein the two total reflective sheets are arranged spaced apart from each other, and the semi-reflective sheet is located between the two total reflective sheets.

3. The light projection device of claim 2, wherein the light-incident surface faces and is in parallel with the first light-emitting surface, and the first light-emitting surface intersects the second light-emitting surface.

4. The light projection device of claim 1, further comprising two diffractive optical elements; wherein one of the two diffractive optical elements is positioned on a light-emitting path of the first light-emitting surface, and the other one of the two diffractive optical elements is positioned on a light-emitting path of the second light-emitting surface.

5. The light projection device of claim 1, further comprising a frame, wherein the frame is configured to fix and support the lens module.

6. The light projection device of claim 5, wherein the frame is made of a transparent material, and the lens module is embedded in the frame.

7. An electronic device, comprising:
a light projection device, the light projection device comprising:
a lens module, the lens module comprising a light-incident surface, a first light-emitting surface, and a second light-emitting surface; and
a light source module, the light source module comprising a light source configured for emitting light toward the light-incident surface;
wherein the first light-emitting surface and the second light-emitting surface are configured to introduce the light from the light source module outside of the light projection device in two different directions;
two cameras, the two cameras cooperating with the light projection device for face recognition; and
a first screen and a second screen;
wherein the first screen and the second screen are two independent screens that can display images independently; one of the two cameras is provided for the first screen and the other one of the two cameras is provided for the second screen; the first screen is provided with a first projection port; the second screen is provided with a second projection port; light exiting from the first light-emitting surface is transmitted to the first projection port, and light exiting from the second light-emitting surface is transmitted to the second projection port.

8. The electronic device of claim 7, wherein the lens module comprises reflective sheets.

9. The electronic device of claim 8, wherein the reflective sheets comprise a semi-reflective sheet and two total reflective sheets.

10. The electronic device of claim 9, wherein the light-incident surface is a reflective surface of one of the two total reflective sheets; the first light-emitting surface is a reflective surface of the semi-reflective sheet, and the second light-emitting surface is a reflective surface of the other one of the two total reflective sheets.

11. The electronic device of claim 10, wherein the two total reflective sheets are arranged spaced apart from each other, and the semi-reflective sheet is located between the two total reflective sheets.

12. The electronic device of claim 11, wherein the light-incident surface faces and is in parallel with the first light-emitting surface, and the first light-emitting surface intersects the second light-emitting surface.

13. The electronic device of claim 7, wherein the light projection device further comprises two diffractive optical elements; one of the two diffractive optical elements is positioned on a light-emitting path of the first light-emitting surface, and the other one of the two diffractive optical elements is positioned on a light-emitting path of the second light-emitting surface.

14. The electronic device of claim 7, wherein the light projection device further comprises a frame; the frame is configured to fix and support the lens module.

15. The electronic device of claim 14, wherein the frame is made of a transparent material, and the lens module is embedded in the frame.

* * * * *